Figure 1:
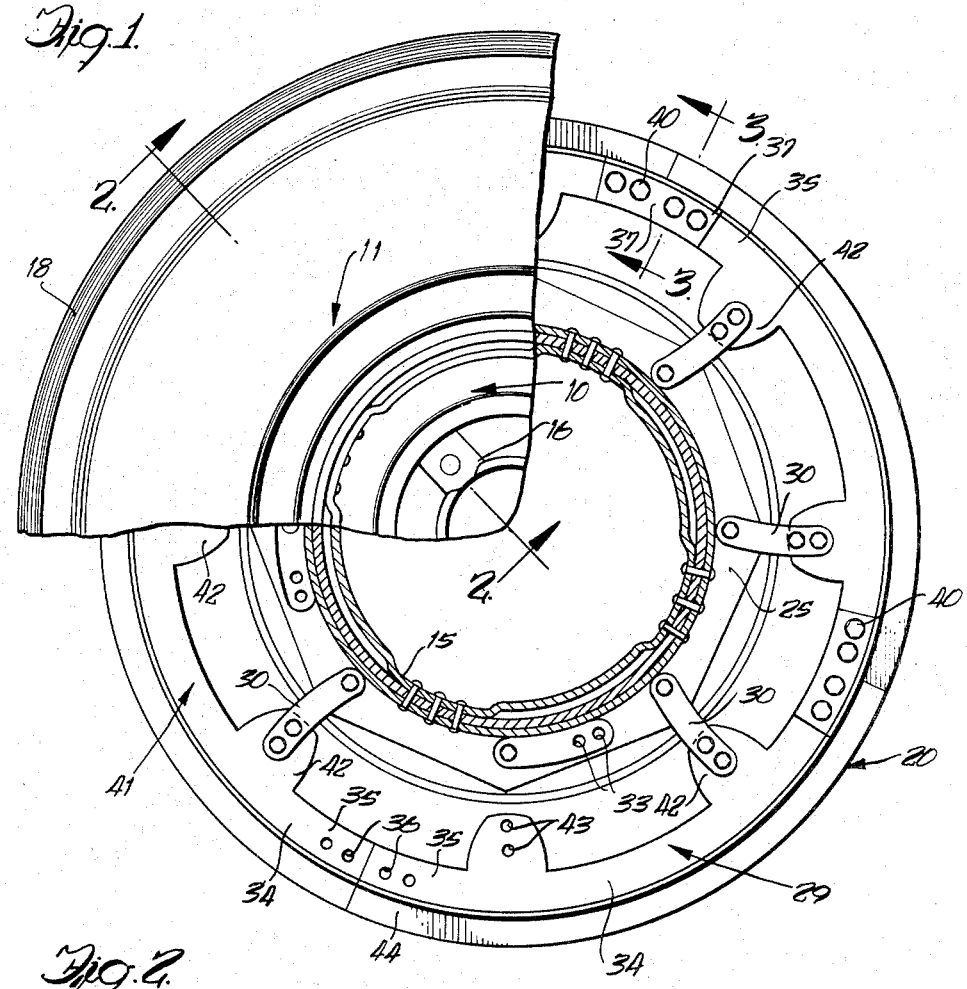

Dec. 25, 1956

C. T. KENNEDY 2,775,282

VEHICLE WHEEL

Filed March 10, 1955

Inventor
Charles T. Kennedy
by Frederick A. Krube
Attorney

United States Patent Office 2,775,282
Patented Dec. 25, 1956

2,775,282

VEHICLE WHEEL

Charles T. Kennedy, Riverside, Ill.

Application March 10, 1955, Serial No. 493,319

9 Claims. (Cl. 152—158)

This invention relates to automotive vehicle appurtenances and more particularly to a motor vehicle safety wheel for use in conjunction with a pneumatic, tubeless tire.

Heretofore, the cause of many serious accidents on the highways and byways has been the sudden and unpredictable deflation of one or more of the vehicle pneumatic tires due to punctures or blow-outs when traveling at a high rate of speed. The vehicle operator has a difficult time attempting to maintain control of the vehicle upon the sudden collapse of a tire because of the relative difference in the rolling radii between a properly inflated tire and wheel assembly and a wheel having a deflated tire mounted thereon since there is a definite tendency for the vehicle to pivot on the collapsed tire before the vehicle can be safely brought to a stop. A great deal of thought and effort has been given to the problem of safeguarding the vehicle, cargo, and its passengers during such an eventuality, but much remains to be desired insofar as the results and costs of providing efficient safety devices are concerned. The primary objective of the present invention is the provision of a vehicle wheel and pneumatic, tubeless tire assembly in which the rolling radius is not materially altered upon the sudden loss of air pressure from within the tire to thus mitigate, if not eliminate, the dangers noted above upon the sudden deflation of the tire. The safety tire and wheel assemblies to which the present invention pertains will adequately support the vehicle and prevent the vehicle from swerving from its intended path in the event that a tire should suddenly and without prior warning blow out.

While the present invention is primarily concerned with the safeguarding of life and limb, it is also effective to prevent the destruction of, or injury to the deflated tire which generally occurs during the elapsed time between the moment of blow-out until the vehicle can be brought to rest. Heretofore, when the tire was completely deflated or having an internal pressure less than the normal pressure corresponding to the properly inflated pressure of the tire, the section of the side walls of the tire adjacent to the ground were caused to flex abnormally to thus subject the side walls to the cutting action of the relatively sharp edges of the rim as well as to weaken the bond that holds the various plies of the tire together which ultimately resulted in the irreparable breakage of the ply material. It is, therefore, another object of the present invention to provide a tire and wheel assembly wherein the tire is protected against damage resulting from total or partial deflation which protection never ceases to exist and enables the vehicle to be operated for an indefinite period of time even though one or more of the tires is under inflated.

Still another object of the present invention is the provision of novel vehicle wheels particularly suitable for use with pneumatic tubeless tires which tire and wheel assemblies are readily interchangeable for the conventional ground-engaging tire and wheel assemblies of a motor vehicle and which, when incorporated in a motor vehicle, eliminates the need for stopping the motor vehicle immediately for the purpose of changing a deflated tire. Furthermore, the use of the tire and wheel assemblies of the present invention precludes the necessity of carrying a spare tire and wheel assembly which are costly and require storage space since, as is well known, tubeless tires are repaired mounted on the vehicle wheel.

Another object is the provision of a simple and efficient safety wheel for supporting a proportional part of the weight of a vehicle equipped therewith in the event the pneumatic tire mounted thereon becomes deflated from punctures, blow-outs or for any other reasons without the tire completely collapsing and includes an annular auxiliary rim which is uniquely attached to the wheel rim upon which the pneumatic tire is mounted and projects inwardly of the tire. The auxiliary rim is mounted on the wheel rim in such a manner so as to afford a radial clearance between the auxiliary rim and the inner surface of the tire tread when the tire is properly inflated but which engages the inner surface of the tire tread when the tire becomes deflated.

A further object is to provide a vehicle wheel of the drop-center rim type having a safety device incorporated therein which safety device is disposed within the pneumatic tire mounted on the wheel and thus is invisible and does not modify the appearance of the wheel or the vehicle. Furthermore, the safety device will not interfere with normal operation of the vehicle and is made of strong and durable parts which are relatively inexpensive to manufacture and simple to assemble and are relatively damage-free and wear-proof.

A still further object is the provision of a sectional auxiliary safety rim and simple and efficient means for joining the sections together and attaching the same to the vehicle wheel to form an effective emergency rolling support should the tire associated therewith become deflated.

Still another object is the provision of a safety auxiliary rim which when used in conjunction with a vehicle pneumatic tubeless tire and wheel assembly prevents abnormal wear of the tire tread resulting from the vehicle rounding curves at speeds and the vehicle weight being shifted to the outer tires sufficient to cause considerable flexing and squealing of the tires disposed on the outside of the curve; the auxiliary rim limits the amount of flexing and provides a relatively solid support between the ground and the wheel hubs.

Figure 2:
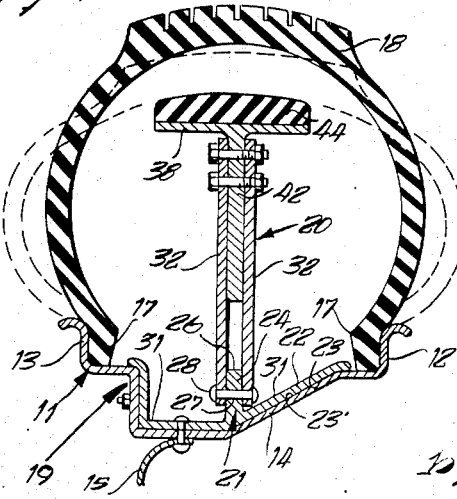
Figure 3:
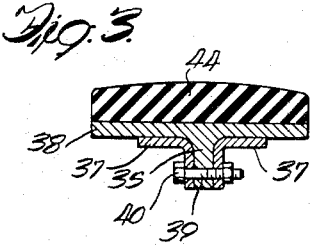

The foregoing and other important objects and desirable features inherent in and encompassed by the invention, together with many of the purposes and uses thereof, will become readily apparent from a reading of the ensuing description in conjunction with the annexed drawing, in which, Figure 1 is a side elevational view of a vehicle tire and wheel assembly embodying the invention; certain parts are broken away to better illustrate the construction and arrangement of the several elements;

Figure 2 is a radial sectional view taken substantially along line 2—2 of Figure 1; and Figure 3 is a radial sectional view taken substantially along line 3—3 of Figure 1.

Referring to the drawing, wherein like reference characters represent like elements throughout the various views, there is shown a wheel body, designated generally by number 10. The wheel body 10 is circumscribed by an annular rim 11. The rim 11 may be formed in any suitable well known manner, as, for example, by rolling a flat sheet in a desired contour and welding the abutting ends to complete the annulus. The cross sectional contour of the rim 11 illustrated is simply one well known form which is in use today and is commonly referred to as a "drop-center" type of rim. The contour of the rim 11 is best shown in Figure 2 and it will be noted that the inner and outer or side flanges or walls 12, 13, respectively, thereof are radially spaced outwardly of the depressed center portion 14. The wheel body 10 has a plurality of circumferentially spaced, attaching flanges 15 bent substantially at right angles to the general plane of the wheel body 10. Moreover, the wheel body 10 is drawn into the general dish shape indicated in Figures 1 and 2, and is provided with a center opening for receiving a hub (not shown), and a flange 16 (partially shown) surrounding the opening suitably apertured and embossed or coined to facilitate bolting of the wheel body 10 to a mounting flange (not shown) on the hub. The details of the formation of the wheel body 10 and rim 11 and the means for securing the wheel body to the vehicle hub constitutes no part of the present invention and it is to be understood that simply one of the variety of well known available forms and means is shown. All the forming operations noted above may, for example, be carried out in a hydraulic press with suitable blanking and forming dies.

The side flanges 12 and 13 of the rim 11 are designed for maintaining the beads 17 of a pneumatic, tubeless tire 18 in position on the rim in the usual manner. The tire beads 17 fit closely against the side flanges 12 and 13 and are sealed thereto in such a manner that air contained within the tire may not escape around the beads.

The safety auxiliary rim and the improved means for mounting the same on the wheel structure 19, decribed above, is designated generally by numeral 20. It is to be understood that the true running qualities of the wheel structure 19 into which the safety device 20 is incorporated is not affected in any way by such incorporation and, furthermore, the safety device 20 adds very little weight over an ordinary tire and wheel assembly. The safety device 20 includes a spoke mounting member 21 which is in the form of a circular flange 22. The radially inner surface 23 of the flange 22 conforms in contour to the radially outer surface 23' of the drop-center portion 14 of the rim 11. The flange 22 is provided with aperatures which are registrable with aligned rivet holes formed in the attaching flanges 15 and the drop-center portion 14 of the rim 11. The wheel body 10, rim 11 and the spoke mounting member 21 are permanently secured together by means of rivets extending through the aligned holes and apertures. To facilitate assembly and manufacture of the spoke attaching member 21, the member 21 is fabricated from three arcuate sectors and the adjacent abutting ends of the sectors are welded together to form a unitary structure. Extending radially from the flange 22 is an integrally-formed rib 24. The rib 24 lies in the plane containing the radially innermost surface portion of the side walls 12 and 13 of the rim 11 and the outer contour of the same, as viewed in Figure 1, is hexagonal to provide six circumferentially spaced spoke mounting portions 25. It will be noted that the radially outermost surface 26 of each portion 25 is spaced radially inwardly of the outer marginal edges of the side walls or flanges 12 and 13 of the rim 11 for a purpose which will be apparent hereinafter. Each spoke mounting portion 25 is provided with an axially extending aperture 27 through which a pivot pin or rivet 28 extends whereby a portion thereof is disposed on each side of the spoke mounting portion 25 associated therewith.

The safety auxiliary rim 29, to be described hereinafter in detail, is connected to the spoke mounting member 21 by means of six spokes 30. All of the spokes 30 are curved in the same direction and each spoke has a radius of curvature slightly greater than the radius of curvature of the radially outwardly facing surface 31 of the flange 22 adjacent to the base of the rib 24. Each spoke 30 comprises a pair of identical bars 32, each of which is disposed on a respective axial side of a spoke mounting portion 25 and is pivotally secured thereto by means of the rivet or pivot pin 28. The spokes 30 are adapted to swing between retracted positions wherein they abut the surface 31 of the flange 22 and extended positions wherein the ends of the spokes opposite the pivotally connected ends are radially spaced outwardly of the rim 11. Each spoke 30 is of an arcuate length less the arcuate distance between adjacent apertures 27 and is adapted to abut the surface 31 when in its retracted position and be disposed radially inwardly of the outermost surfaces 26 of the spoke mounting portions 25. Consequently, since the rib 24 as well as the spokes 30 when in their retracted positions are disposed radially inwardly of the rim side walls 12 and 13, the rib and spokes do not interfere with the mounting and dismounting of the tire 18 on and from the rim 11. The free end of each bar 32 is provided with a pair of apertures 33 which are alignable with the apertures 33 formed in the other bar 32 of each spoke 30.

The safety auxiliary rim 29 is constructed of three arcuate segments 34 which, when assembled together, as will be pointed out hereinafter, from a circular rim. Each segment 34 is generally T-shaped in radial cross section, as shown in Figure 3, and the end portions of the radially projecting flange 35 are each provided with a pair of circular holes 36. The end of each segment 34 is adapted to abut the end of an adjacent segment and a pair of substantially L-shaped securing or connecting plates 37 are adapted to abut respective opposite sides of the flange 35 and the radial underside of the web 38. The securing plates 37 overlap the end portions of respective segments 34 and are provided with apertures 39 registrable with the holes 36. Bolt and nut assemblies 40 are employed for fastening the segments 34 and the securing plates together. The projecting flanges 35 form a continuous circular flange 41 when the segments 34 are assembled together which is provided with six circumferentially spaced, radially enlarged spoke attaching pads 42 which are integrally formed with the flanges 35. Each pad 42 is provided with a pair of apertures 43 which are registrable with the apertures 33 formed in the free end of the bars 32 of a respective spoke 30 when the spoke is in its extended position. As best shown in Figure 2, when the spokes 30 are in their extended positions the bars 32 of each spoke abut respective opposite sides of a pad 42. In order to secure the auxiliary rim 29 in operative position, as shown in Figure 1, bolt and nut assemblies, adapted to extend through each set of aligned apertures 33, 43, are used. From the foregoing it will be appreciated that the auxiliary rim 29 is rigidly maintained in a radially spaced relationship with respect to the wheel rim 11 by the relatively lightweight but extremely strong spokes 30.

Rigidly secured to the outer peripheral surface of the web 38 of each segment 35, by vulcanizing, cementing, or by any other suitable manner, is a tire contacting member 44 which has a rectangular cross section. The tire contacting members 44 illustrated are made of semi-hard rubber so as to insure durability and long wear, and at the same time provide a cushioning effect when the tire 18 becomes deflated, as will be pointed out hereinafter. It is to be understood that while the tire contacting members 44 are illustrated as being formed of rubber, any other resilient composition or material having like physical characteristics could be employed in lieu thereof.

When assembling the tire 18 and the safety auxiliary rim 29 upon the wheel rim 11, the following steps are followed: Before mounting the tubeless tire 18 on the wheel rim 11, the three segments 35 of the safety auxiliary rim 29 are assembled within the tire casing. The tire 18 together with the safety auxiliary rim 29 assembled therein is then moved transversely or axially of the vehicle wheel with one bead resting upon the inner surface of one of the rim side walls 12 or 13 beyond the rib 24 and the other bead out of engagement with the rim 11. It is to be understood that during the advancement of the tire 18 on the rim 11 the spokes 30 are in their retracted positions and do not interfere with such mounting operation. The tire bead which has not been moved into operative engagement with the wheel rim 11 is then drawn outwardly a sufficient distance to permit swinging of each spoke 30, one after the other, to its extended position. The free end of each spoke 30 is then securely fastened to a respective pad 42. After all the spokes 30 are attached to the pads 42 and thus the safety auxiliary rim 29 is rigidly connected to the wheel rim 11, the bead of the tire 18, which up to this point has been free from the wheel rim 11, is now moved into engagement with the rim side wall 12 or 13 in the usual manner and the tire 18 will then be in place about the wheel rim 11 with its beads engaging the side flanges or walls 12 and 13. A conventional air inlet valve 45 is carried by the rim 11 for inflating the tire 18. The tire 18 is then inflated to a pressure corresponding to its fully inflated condition and is firmly held on the wheel rim 11 in a conventional manner.

When the vehicle wheel and tire assembly described above is operated under normal road conditions and the tire 18 is properly inflated, the inner surface of the tire tread is maintained in a radially spaced relationship with the rubber contacting members 44, as shown in Figure 2. However, should the tire 18 become deflated due to a puncture, blow-out, or for any other reason, the inner surface of the tire tread will be depressed, as shown by dotted lines in Figure 2, so as to engage the contact member 44. A proportionate part of the weight of the vehicle will then be transmitted through the rim 11, flange 24, spokes 30 and safety auxiliary rim 29 to the tire tread. Inasmuch as the contacting members 44 when the segments 35 are assembled form a continuous rubber ring which has its outer peripheral surface spaced approximately ¾ to 1¼ inches from the tire tread when the tire 18 is properly inflated, the vehicle wheel would only drop ¾ to 1¼ inches upon the occurrence of a blow-out. Consequently, the side walls of the tire 18 are not abnormally flexed or buckled and caused to become disengaged from the wheel rim 11 which generally results in the vehicle swerving out of control. The safety auxiliary rim 29 will efficiently support the tire 18, preventing the same from dropping to the rim 11 and at the same time allowing the vehicle operator to maintain proper control over the steering of the vehicle.

From the foregoing it will be appreciated that the tire 18 used in conjunction with the novel wheel assembly described above will never run flat and ruin the same as is generally the case in the event a blow-out or puncture occurs of a tire mounted on a conventional wheel assembly. Furthermore, since the wheel assembly acts to protect the tire inasmuch as the side walls of the tire are not subjected to abnormal flexures which tend to weaken the tire casing, the vehicle may be safely driven until a time when it is convenient to repair the tire without seriously hampering the continued operation of the vehicle or damaging the deflated tire. It should also be borne in mind that since the contact members 44 are made of rubber or like material as is somewhat resilient and the tire tread itself is made of cushioning material, a fair amount of road shock will be absorbed even though the pneumatic tire is deflated.

The embodiment of the invention chosen for the purposes of illustration and description herein is that preferred as the result of selective tests based upon the requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modification of the invention as fall within the spirit and scope of the invention as defined in the appended claims.

What is claimed is:

1. A tire and wheel assembly comprising a pneumatic tubeless tire comprising a casing having a tread and side walls terminating in spaced rim-engaging means; a drop-center type wheel rim having axially spaced side walls for engaging said tire beads and a central depressed annular portion radially spaced inwardly of the outer marginal edges of said wheel rim side walls; a central annular flange fixed and projecting radially outwardly with respect to said wheel rim depressed annular portion, said flange terminating radially inwardly of the base of said wheel rim side walls; a safety auxiliary rim disposed within said tire casing having an outer diameter less than the inner diameter of said tire tread when said tire is inflated and an inner diameter greater than the diameter of the outer marginal edges of said wheel rim side walls; a plurality of circumferentially spaced spokes, each of said spokes having one end pivotally connected to said annular flange and being pivotal between a retracted position wherein said spoke lies adjacent the base of said annular flange and is completely disposed radially inwardly of the base of said wheel rim side walls and an extended position wherein said spoke projects radially outwardly into the interior of said tire casing; and means for detachably connecting the ends of said spokes opposite the pivotally connected ends thereof to said auxiliary rim when said spokes are in their extended positions to maintain said auxiliary rim radially spaced from said wheel rim, said auxiliary rim being adapted to operatively engage the inner surface of said tire tread upon deflation of said tire.

2. A tire and wheel assembly substantially as set forth in claim 1, in which, said safety auxiliary rim includes a plurality of arcuate segments arranged end to end, and means for detachably connecting adjacent ends of said segments together; and a pad of rubber-like material secured to and extending the full arcuate length thereof whereby said pads form a substantially continuous cushioning ring normally radially spaced from said tire tread when said auxiliary rim is connected to said spokes and said tire is inflated, said ring being adapted to frictionally engage the inner surface of said tire tread upon deflation of said tire to transmit weight of the vehicle received by said spokes and auxiliary rim from said wheel rim to said tire.

3. A tire and wheel assembly substantially as set forth in claim 2, in which, said spokes are each curved in the same direction and each spoke has a radius of curvature slightly greater than the radius of curvature of said depressed annular portion of said wheel rim and is of an arcuate length less than the arcuate distance between the pivotal connections of adjacent spokes with said projecting flange.

4. A tire and wheel assembly comprising a pneumatic tubeless tire comprising a casing having a tread and side walls terminating in spaced rim-engaging beads; a drop-center type wheel rim having axially spaced side walls for receiving said tire beads and a central depressed annular portion radially spaced inwardly of the outer marginal edges of said rim side walls; a safety auxiliary rim disposed within said tire casing having an outer diameter less than the inner diameter of said tread when said tire is inflated and an inner diameter greater than the diameter of the outer marginal edges of said wheel rim side walls; a plurality of circumferentially spaced spokes, each of said spokes having one end pivotally carried by said wheel rim and being pivotal between a retracted position wherein said spoke is completely disposed radially inwardly of the radially outermost marginal edges of said wheel rim side walls and an extended position wherein said spoke projects radially outwardly into the interior of said tire casing; and means for detachably connecting the ends of said spokes opposite the pivotally carried ends thereof to said auxiliary rim when said spokes are in their extended positions to maintain said auxiliary rim radially spaced from said wheel rim, said auxiliary rim being adapted to operatively engage the inner surface of said tire tread upon deflation of said tire.

5. A tire and wheel assembly substantially as set forth in claim 4, in which, said safety auxiliary rim includes a plurality of arcuate segments arranged end to end, and means for detachably connecting adjacent ends of said segments together; and a pad of rubber-like material secured to and extending the full arcuate length thereof whereby said pads form a substantially continuous cushioning ring normally radially spaced from said tire tread when said auxiliary rim is connected to said spokes and said tire is inflated, said ring being adapted to frictionally engage the inner surface of said tire tread upon deflation of said tire to transmit weight of the vehicle received by said spokes and auxiliary rim from said wheel rim to said tire.

6. A tire and wheel assembly comprising a wheel rim having a central, radially depressed annular portion; a pneumatic tubeless tire having a tread mounted on said rim; a plurality of circumferentially spaced spoke means pivotally carried by said rim, said spoke means being pivotal between retracted positions wherein said spoke means are completely disposed radially inwardly of the radially outermost marginal edges of said rim adjacent said depressed annular portion and extended positions wherein said spoke means project radially outwardly into the interior of said tire; a safety auxiliary rim disposed within said tire and normally radially spaced from said tire tread and rim when said tire is inflated; and means for detachably connecting said spoke means and said auxiliary rim when said spoke means are in their extended positions to maintain said auxiliary rim radially spaced from said rim, said auxiliary rim being adapted to operatively engage the inner surface of said tire tread upon deflation of the tire.

7. In a tire and wheel assembly comprising a wheel rim having a central, radially depressed annular portion; a pneumatic tire having a tread mounted on said rim; supporting means carried by said depressed annular portion of said rim, said supporting means being movable between a retracted position wherein said supporting means is completely disposed radially inwardly of the radially outermost marginal edges of said rim adjacent said depressed annular portion and an extended position wherein said supporting means projects radially outwardly into the interior of said tire; a safety auxiliary rim disposed within said tire and normally radially spaced from said tire tread and rim when said tire is inflated; and means for detachably connecting said supporting means and said auxiliary rim when said supporting means is in its extended position to maintain said auxiliary rim radially spaced from said rim, said auxiliary rim being adapted to operatively engage the inner surface of said tire tread upon deflation of the tire.

8. In a tire and wheel assembly comprising a wheel rim; a pneumatic tire mounted on said rim; an annular member disposed within said tire and spaced radially from said rim, said annular member normally being out of operative engagement with said tire when said tire is inflated; and supporting means carried by said rim adapted to maintain said annular member spaced from said rim, said supporting means being movable between a first position wherein said supporting means is completely disposed radially inwardly of the radially outermost marginal edge of said rim and a second position wherein said supporting means extends radially outwardly with respect to said rim into the interior of said tire; and means for detachably connecting said supporting means and annular member when said supporting means is in said second position whereby said annular member is maintained in a radially spaced relationship with said rim and is out of operative engagement with said tire when said tire is inflated, said annular member being adapted to operatively engage the inner surface of said tire upon deflation of the same.

9. A vehicle tire and wheel assembly comprising a wheel rim; a pneumatic tubeless tire having a tread mounted on said rim; a substantially rigid annular member disposed within said tire and radially spaced between said rim and tire tread, said annular member normally being out of operative engagement with said tire when said tire is inflated; and interconnecting means including radially movable means, said radially movable means being movable between a retracted position and an extended position wherein said interconnecting means extends between said rim and annular member, said interconnecting means including detachable connecting means for securing said movable means to said annular member when in its extended position for rigidly maintaining said annular member in its normally radially spaced position with respect to said tire and rim, said annular member and interconnecting means being adapted to transmit weight of the vehicle from said rim to said tire when said annular member operatively engages said tire tread.

References Cited in the file of this patent

UNITED STATES PATENTS

| | | |
|---|---|---|
| 2,165,810 | Paselk | July 11, 1939 |
| 2,241,858 | Hruska | May 13, 1941 |

FOREIGN PATENTS

| | | |
|---|---|---|
| 350,128 | France | Aug. 22, 1905 |